United States Patent
Boss et al.

(10) Patent No.: US 8,095,975 B2
(45) Date of Patent: Jan. 10, 2012

(54) DYNAMIC DOCUMENT MERGING METHOD AND SYSTEM

(75) Inventors: Gregory Jensen Boss, American Fork, UT (US); Yen-Fu Chen, Austin, TX (US); Rick Allen Hamilton, II, Charlottesville, VA (US); Hari Shankar, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 12/050,585

(22) Filed: Mar. 18, 2008

(65) Prior Publication Data

US 2009/0241183 A1  Sep. 24, 2009

(51) Int. Cl.
*G06F 7/00* (2006.01)
*G06F 17/00* (2006.01)
*G06F 17/30* (2006.01)
*G06F 15/16* (2006.01)
*G06F 17/27* (2006.01)
*H04N 1/00* (2006.01)
*G06F 17/24* (2006.01)
*G06Q 10/00* (2006.01)

(52) U.S. Cl. .......... 726/17; 715/234; 715/255; 709/246; 707/999.1; 707/999.003; 726/27

(58) Field of Classification Search ............... 726/17, 726/27; 715/500; 709/246; 707/100
See application file for complete search history.

(56) References Cited

U.S. PATENT DOCUMENTS

2003/0182450 A1* 9/2003 Ong et al. ............ 709/246
2007/0136318 A1* 6/2007 Clark et al. .......... 707/100

FOREIGN PATENT DOCUMENTS

WO   WO 2008118715 A1 * 10/2008

OTHER PUBLICATIONS

Connolly, D.; Keenan, F.; Ryder, B.; "Tag Oriented Agile Requirements Identification", Engineering of Computer Based Systems, 2008. ECBS 2008. 15th Annual IEEE International Conference and Workshop on the Digital Object Identifier: 10.1109/ECBS.2008.26, Publication Year: Aug. 2008, pp. 497-498.*

* cited by examiner

*Primary Examiner* — Eleni Shiferaw
*Assistant Examiner* — Courtney Fields
(74) *Attorney, Agent, or Firm* — Schmeiser, Olsen & Watts; William Schlesser

(57) ABSTRACT

A document merging method and system. The method includes receiving by a computing system from a first user, a plurality of documents and a command for tagging portions of each document according to various parameters. The computing system assigns identification tags to the portions of each document. The computing system receives from a second user, a command for generating a merged document. The computing system receives a selection of a first identification tag associated with a first document and a selection of a second identification tag associated with a second document. The computing system generates a merged document comprising a first portion of the first document and said second portion of the second document. The computing system stores the merged document.

25 Claims, 6 Drawing Sheets

DYNAMIC DOCUMENT MERGING METHOD AND SYSTEM

FIELD OF THE INVENTION

The present invention relates to a method and associated system for merging documents based on various parameters.

BACKGROUND OF THE INVENTION

Combining specific data portions from various data streams typically comprises a complicated and inefficient process with little flexibility. Accordingly, there exists a need in the art to overcome at least some of the deficiencies and limitations described herein above.

SUMMARY OF THE INVENTION

The present invention provides a document merging method comprising:

receiving, by a computing system, a plurality of documents, wherein said computing system comprises a memory system;

receiving, by said computing system from a first user, a first command for tagging portions of each document of said plurality of documents according to various parameters;

assigning, by said computing system in response to said first command, identification tags to said portions of each said document, wherein each portion of said portions is assigned an associated identification tag of said identification tags;

storing, by said computing system within said memory system, said documents comprising said identification tags;

receiving, by said computing system from a second user, a second command for generating a merged document;

presenting, by said computing system to said second user, said identification tags;

receiving, by said computing system from said second user, a first selection of a first tag of said identification tags, said first tag associated with a first portion of a first document of said plurality of documents;

receiving, by said computing system from said second user, a second selection of a second tag of said identification tags, said second tag associated with a second portion of a second document of said plurality of documents;

generating, by said computing system in response to said first selection and said second selection, said merged document, said merged document comprising said first portion of said first document and said second portion of said second document; and storing, by said computing system, said merged document in said memory system.

The present invention provides a computing system comprising a processor coupled to a computer-readable memory unit, said memory unit comprising instructions that when executed by the processor implement a document merging method, said method comprising:

receiving, by said computing system, a plurality of documents;

receiving, by said computing system from a first user, a first command for tagging portions of each document of said plurality of documents according to various parameters;

assigning, by said computing system in response to said first command, identification tags to said portions of each said document, wherein each portion of said portions is assigned an associated identification tag of said identification tags;

storing, by said computing system within said computer-readable memory unit, said documents comprising said identification tags;

receiving, by said computing system from a second user, a second command for generating a merged document;

presenting, by said computing system to said second user, said identification tags;

receiving, by said computing system from said second user, a first selection of a first tag of said identification tags, said first tag associated with a first portion of a first document of said plurality of documents;

receiving, by said computing system from said second user, a second selection of a second tag of said identification tags, said second tag associated with a second portion of a second document of said plurality of documents;

generating, by said computing system in response to said first selection and said second selection, said merged document, said merged document comprising said first portion of said first document and said second portion of said second document; and storing, by said computing system, said merged document in said computer-readable memory unit.

The present invention provides a process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing a document merging method, said method comprising:

receiving, by said computing system, a plurality of documents;

receiving, by said computing system from a first user, a first command for tagging portions of each document of said plurality of documents according to various parameters;

assigning, by said computing system in response to said first command, identification tags to said portions of each said document, wherein each portion of said portions is assigned an associated identification tag of said identification tags;

storing, by said computing system within said computer-readable memory unit, said documents comprising said identification tags;

receiving, by said computing system from a second user, a second command for generating a merged document;

presenting, by said computing system to said second user, said identification tags;

receiving, by said computing system from said second user, a first selection of a first tag of said identification tags, said first tag associated with a first portion of a first document of said plurality of documents;

receiving, by said computing system from said second user, a second selection of a second tag of said identification tags, said second tag associated with a second portion of a second document of said plurality of documents;

generating, by said computing system in response to said first selection and said second selection, said merged document, said merged document comprising said first portion of said first document and said second portion of said second document; and storing, by said computing system, said merged document in said computer-readable memory unit.

The present invention provides a computer program product, comprising a computer readable medium comprising a computer readable program code embodied therein, said computer readable program code adapted to implement a document merging method within a computing system, said method comprising:

receiving, by said computing system, a plurality of documents;

receiving, by said computing system from a first user, a first command for tagging portions of each document of said plurality of documents according to various parameters;

assigning, by said computing system in response to said first command, identification tags to said portions of each said document, wherein each portion of said portions is assigned an associated identification tag of said identification tags;

storing, by said computing system, said documents comprising said identification tags;

receiving, by said computing system from a second user, a second command for generating a merged document;

presenting, by said computing system to said second user, said identification tags;

receiving, by said computing system from said second user, a first selection of a first tag of said identification tags, said first tag associated with a first portion of a first document of said plurality of documents;

receiving, by said computing system from said second user, a second selection of a second tag of said identification tags, said second tag associated with a second portion of a second document of said plurality of documents;

generating, by said computing system in response to said first selection and said second selection, said merged document, said merged document comprising said first portion of said first document and said second portion of said second document; and storing, by said computing system, said merged document.

The present invention advantageously provides a method and associated system capable of combining specific data portions from various data streams.

DETAILED DESCRIPTION OF THE INVENTION

Figure 1:
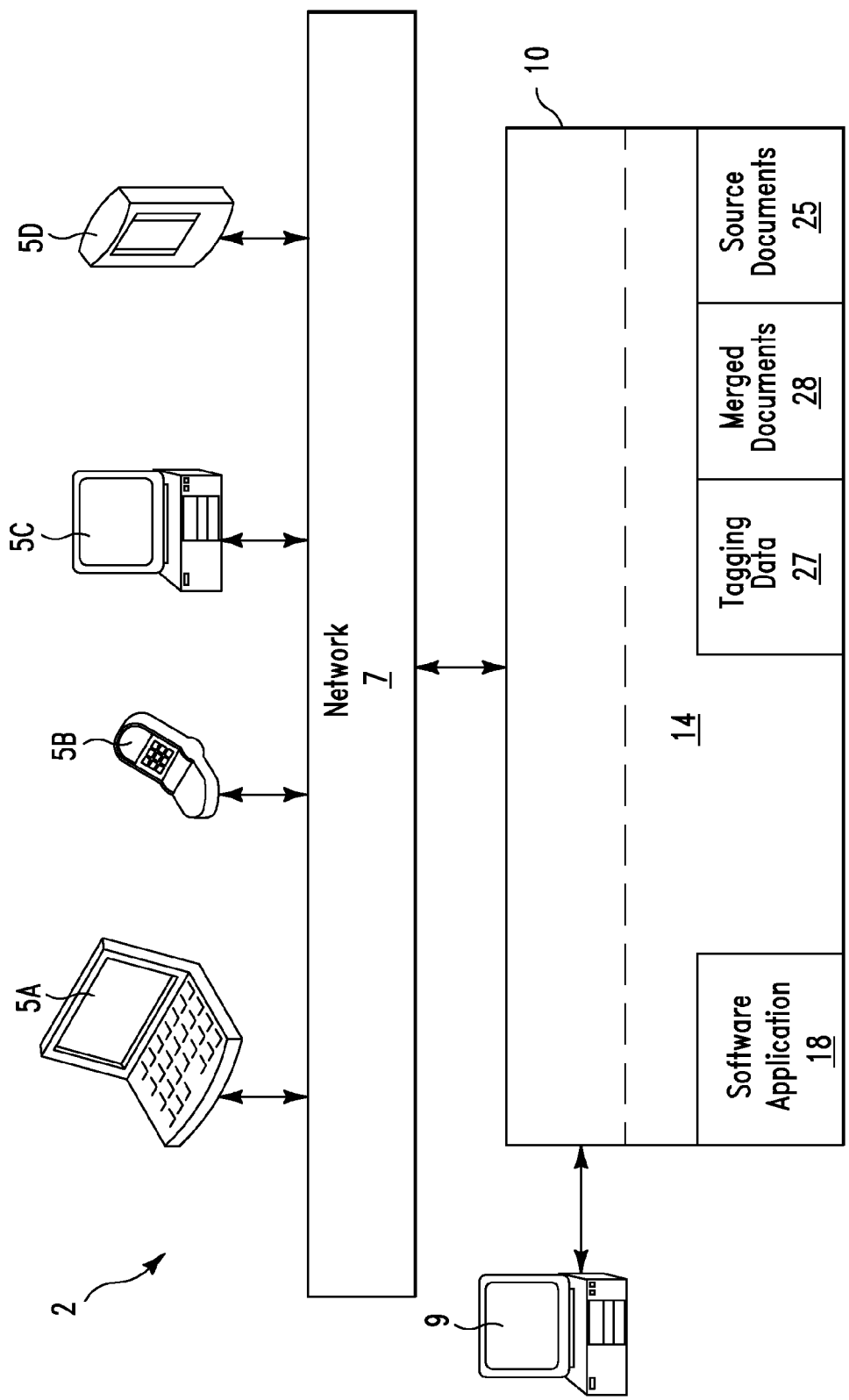
FIG. 1 illustrates a system for merging source documents according to various parameters, in accordance with embodiments of the present invention.

FIG. 1 illustrates a system 2 for merging source documents 25 according to various parameters, in accordance with embodiments of the present invention. Source documents 25 may comprise any type of documents such as, inter alia, word processing documents, PDF documents, web page documents, email documents, etc. Merging documents 25 may comprise:

1. Extracting different portions of various documents (i.e., from source documents 25 such that the various portions of the documents (e.g., paragraphs, sentences, etc) are placed in a single merged document).
2. Generating a merged document such that only specified portions of the original source documents (e.g., paragraphs, sentences, etc) are viewable by a second user (i.e., viewing the merged document).

Source document(s) 25 may be merged by a user that generates (i.e., an author of the documents) the documents or by a first user that receives the documents from a second user that generates the documents. System 2 provides dynamic document merging and management capabilities. System 2 allows a user to:

1. Create and input source documents 25 into system 2.
2. Visually scan source documents 25 and identify keywords that match a set of predefined tags (e.g., take user input to learn new tags specific to the documents). A tag comprises a method to denote a topic (i.e., a subject to be discussed or addressed in a general or a specified method) to be categorized.
3. Accept user input for specified weighting applied to the tags.

Based on the document(s) and the predefined tags, system 2 allows user to generate merged documents 28 based on any combination of the following parameters:

1. Dynamic merging of source documents 25 based on tagged elements such as, topic, category (i.e., a grouping system of the item based on commonality or similarities determined by a user or specified by a specific role), team or workgroup, user's role (i.e., a set of connected behaviors or actions that are performed by a person, team, or group in a specific context), user's responsibility, or low level task description.
2. Dynamic merging of source documents 25 based on a topic predefined priority or rating (i.e., a severity level that takes precedence over other severity levels).
3. Dynamic merging of source documents 25 based on a fragment level.
4. Dynamic merging of source documents 25 based on an audience's (i.e., a second user) interest.
5. Dynamic creation of table of contents (TOC) based on the user's selection of a topic for merging.

Once tags are defined and stored in a repository, a user may automate system 2 by:

1. Checking access control for source documents 25 residing in computing system 10.
2. Select sections of source documents 25 based on tags defined for the source documents 25.
3. Handle cross domain merging for creation and viewing of merged documents 28 through access privilege and granted permission at the tagged document section and user ID levels.
4. Look-up standard templates on top of the dynamic merge performed in order to generate document formats that a specific user is familiar with.

System 2 additionally allows an administrator to perform an authorization process to allow a user to merge source documents 25. The authorization process may be performed via, instant messaging, email, etc. The authorization process may comprise:

1. Verifying access privileges for each of source documents 25 used for the merging.
2. Soliciting permission to be used as a source where necessary based on policies defined in role based access control systems and tags.
3. Obtaining approval in real time with integration of instant messaging and email.

System 2 of FIG. 1 comprises a plurality of input/output (I/O) devices 5A . . . 5D connected to a computing system 10 through a network 7. I/O devices 5A . . . 5D may comprise any type of I/O device such as, inter alia, a notebook computer 5A, a cellular telephone 5B, a desktop computer 5C, a personal digital assistant (PDA) 5D, etc. Network 7 may comprise any type of network including, inter alia, a local area network, (LAN), a wide area network (WAN), the Internet, etc. Additionally, system 2 comprises an administrator terminal 9. Computing system 10 may comprise any type of computing system including, inter alia, a personal computer (PC), a server computer, a database computer, etc. Computing system 10 comprises a memory apparatus 14. Memory apparatus 14 comprises a software application 18, tagging data 27, merged documents 28, and source documents 25. Software application 18 controls all functions related to:

1. Merging source documents 25.
2. Authorizing a user to merge (portions of) source documents 25.

Tagging data 27 comprises data related to predefined tags. A tag is defined herein as a data marker used to denote a topic to be categorized. Merged documents 28 comprise any of source documents 25 that have been merged. I/O devices 5A . . . 5D allow users to submit source documents 25 into computing system 10 and access computing system 10 for merging source documents. Administrator terminal 9 allows an administrator to authorize a merged document.

Software application 18 allows for the following functionality with respect to merging source documents 25:

1. Creation of topics by using a tagging library that may be applied to document content for enabling a dynamic rearrangement of the document. A priority level and rating may also be applied to each topic. This function is performed by a designer of the document.
2. In the case of a central repository system (as illustrated in FIG. 1), a user may extract or search content section(s) from any source document that resides on a central server (i.e., computing system 2). In the case of a peer-to-peer system, a user may extract or search content section(s) from any source document that resides on any peer machine(s) (i.e., on any of I/O devices 5A . . . 5D).
3. Encapsulating access control implementations into the merging policy by applying a security model. Handles cross domain merging for creation and viewing of documents through access privilege and granted permission at the tagged document section and user ID levels.
3. Enables federated document management to simplify document creation and dynamic customization for viewing, which also avoids duplicate document sections and duplicate efforts.
5. Enables static and dynamic security policies in a federated document management environment and ties role, document tag, and fragment level based on access control to federated document management.
6. Enable a user to create documents based on a set of standard templates that the client company is familiar with. For example, company A employees are used to viewing user guides in a specific format set by company A. Using a set standard templates combined with a tagging library, any document that company B delivers to company A will follow similar standards and formatting regardless of any information provided. Therefore company B may quickly deliver documents to company A in company A's preferred format without exposing any company B formats or related IP.

Software application 18 allows for the following functionality with respect to allowing an administrator to authorize a merging process:

1. Extended control capability for the original source documents so that when a second user (i.e., receiving user) executes a drag-n-drop menu or selects sections to create a merged document, the original author of the document may be notified of the change. Depending on a security setting, the original author of the source document may be prompted to dynamically authorize the change in real-time and from a remote location.
2. Rapid approval with instant message (IM) integration. An original author's information is embedded during a source document creation process and therefore a modification process applied to tagged section(s) of the source document may trigger an approval process via IM or email. Computing system 10 will parse an IM response or email subject line and apply the appropriate approval code and response to the documents across network 7. Computing system 10 may also integrate with a computer telephony integration (CTI) system in order to solicit a document merging approval using LAN or VOIP lines.
3. Provides a separation of duty capability in order to comply with federal regulations and company security policies. For example, two approvers may be required (i.e., a person who generated the merged document may not be the approver for a particular document or section(s) of a document).
4. Provides a full audit capability. For example, logging essential data, a tags/field/section/document may be configurable by an administrator, storing a history trail of document merging and approval, including an archive utility at a database and document level, etc.

The following description (steps) illustrates an example of implementation for using source documents 25 to generate a merged document according to various parameters:

1. A user A begins a search for content information (i.e., from source documents) that he/she needs.
2. User A access a database (i.e., computing system 10) and retrieves relevant documents.
3. Computing system 10 performs a search of the retrieved documents to locate content associated with selected parameters.
4. User A verifies and highlights relevant content.
5. XML tags are generated to consolidate the relevant content.
6. Computing system 10 performs a role document process and fragment level check.
7. If the role document process and fragment level check determines any errors, then user A will be required to fix the errors and repeat the process.
8. If the role document process and fragment level check determines no errors then a security check is performed.
9. If the security check determines a problem, then user A will be required to correct the problem and repeat the process.
10. If the security check determines no problem then an initial draft of a merged document is generated.
11. User A reviews the merged document and performs any necessary modifications.
12. User A determines which template model to apply to the merged document.

Figure 2:
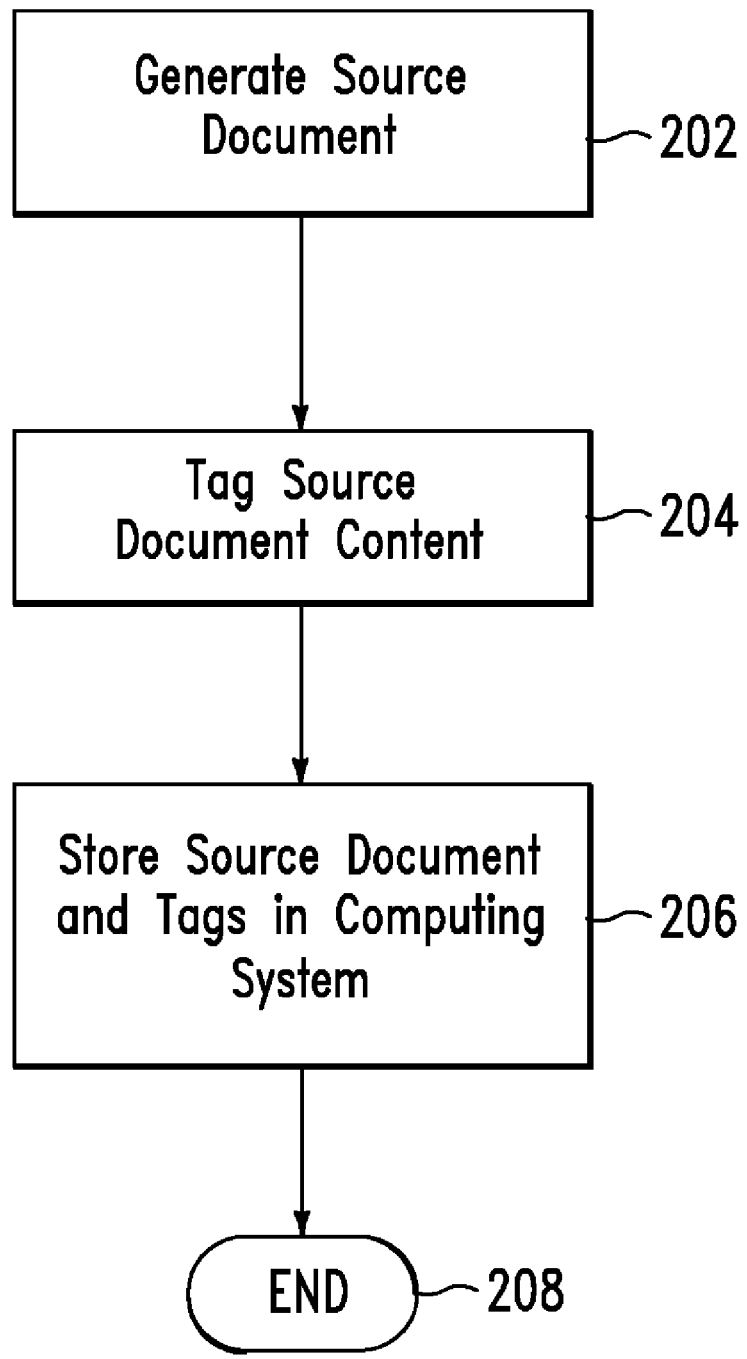
FIG. 2 illustrates a flowchart describing an overall algorithm used by the system of FIG. 1 for generating and tagging a source document, in accordance with embodiments of the present invention.

FIG. 2 illustrates a flowchart describing an overall algorithm used by system 2 of FIG. 1 for generating and tagging source documents, in accordance with embodiments of the present invention. In step 202, a user generates a source document. In step 204, the user tags portions of the source document according to various parameters. Parameters may include, inter alia, a user role, a priority, a topic of preference, a category, etc. In step 206, the source document and tags are stored in computing system 10 and the process terminates is step 208.

Figure 3:
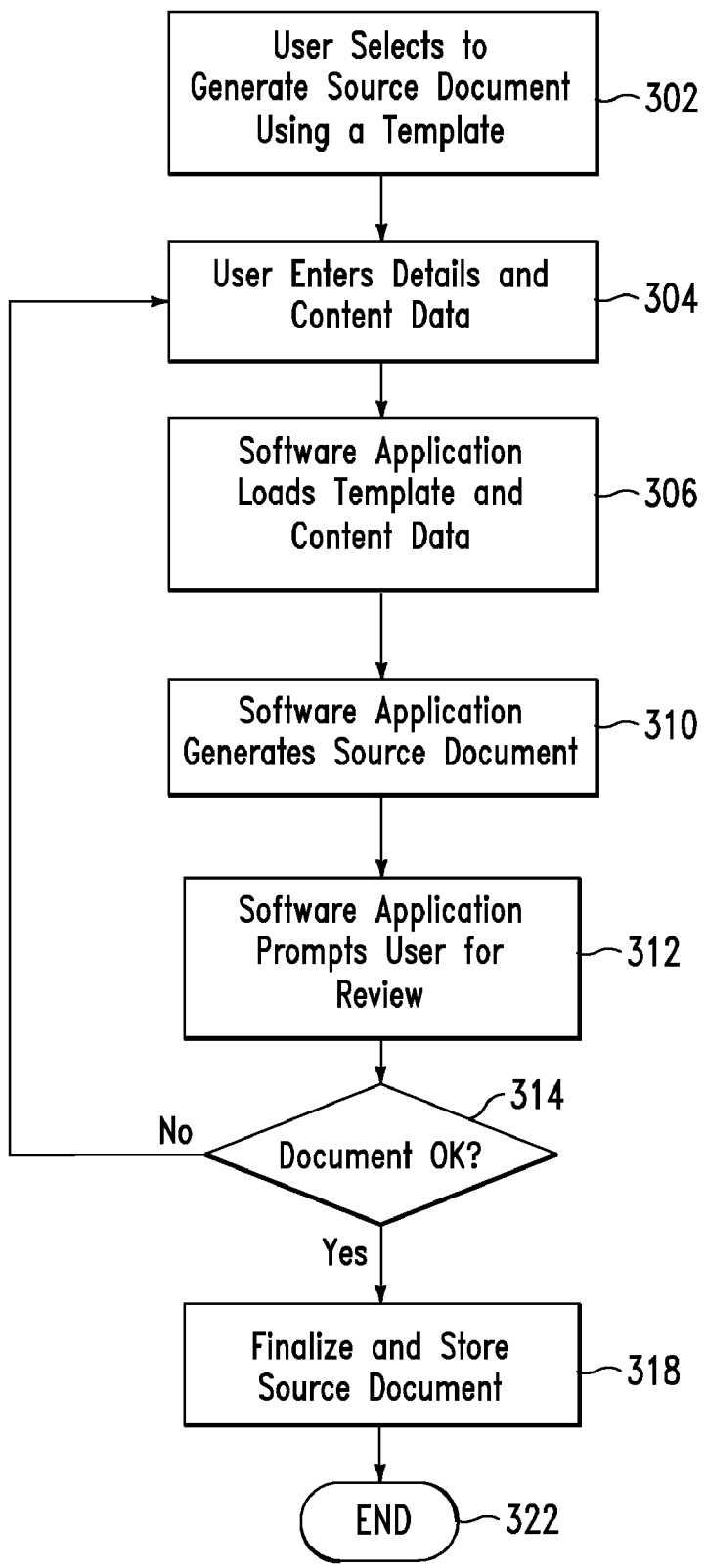
FIG. 3 illustrates a flowchart detailing a step of FIG. 2, in accordance with embodiments of the present invention.

FIG. 3 illustrates a flowchart detailing step 202 of FIG. 2, in accordance with embodiments of the present invention. In step 302, the user selects to generate the source document using a template. In step 304, the user enters source document details and source document content data. Source document details may include, inter alia, a specified template type, a company for the user, an arrangement for the content data, etc. In step 306, software application 18 loads the selected template and entered content data. In step 310, software application 18 generates the source document using the selected template and entered content data. In step 312, software application 18 prompts the user to review the source document. In step 314, the user determines if the source document is ok (i.e., comprises correct content). If in step 314, the user determines that the source document is ok then in step 318, the source document is finalized and stored and the process ends in step 322. If in step 314, the user determines that the source document is not ok, then step 304 is repeated.

Figure 4:
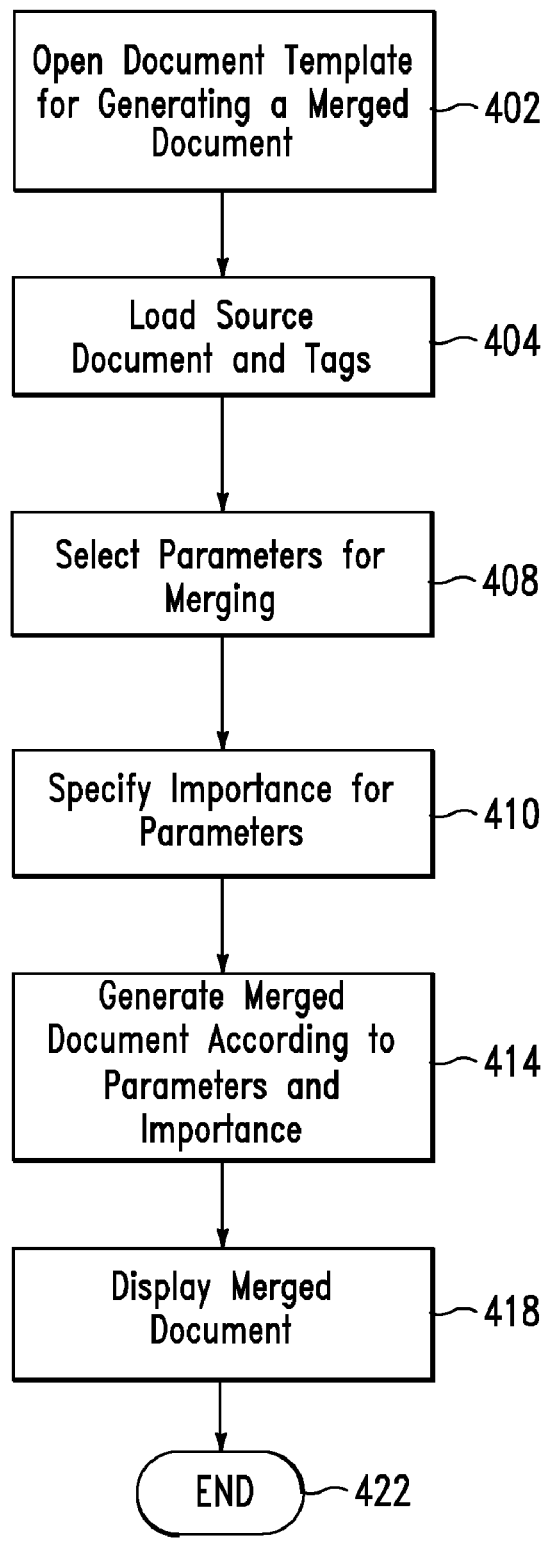
FIG. 4 illustrates a flowchart describing an overall algorithm used by system of FIG. 1 for merging source documents, in accordance with embodiments of the present invention.

FIG. 4 illustrates a flowchart describing an overall algorithm used by system 2 of FIG. 1 for generating a merged document, in accordance with embodiments of the present invention. In step 402, a merged document template for generating a merged document is selected and opened. In step 404, source documents and the associated tags are loaded onto an I/O device (e.g., one of I/O devices 5A . . . 5D) being used by the user. In step 408, the user selects specified parameters for merging the source documents. The specified parameters may include a ranking or weight, specified topics, a role, content, task, category, etc. In step 410, the user ranks the parameters by importance. In step 414, software application 18 generates a merged document according to the parameters selected in step 408 and the parameter ranking from step 410. In step 418, the merged document is displayed for the user and the process terminates in step 422.

Figure 5:
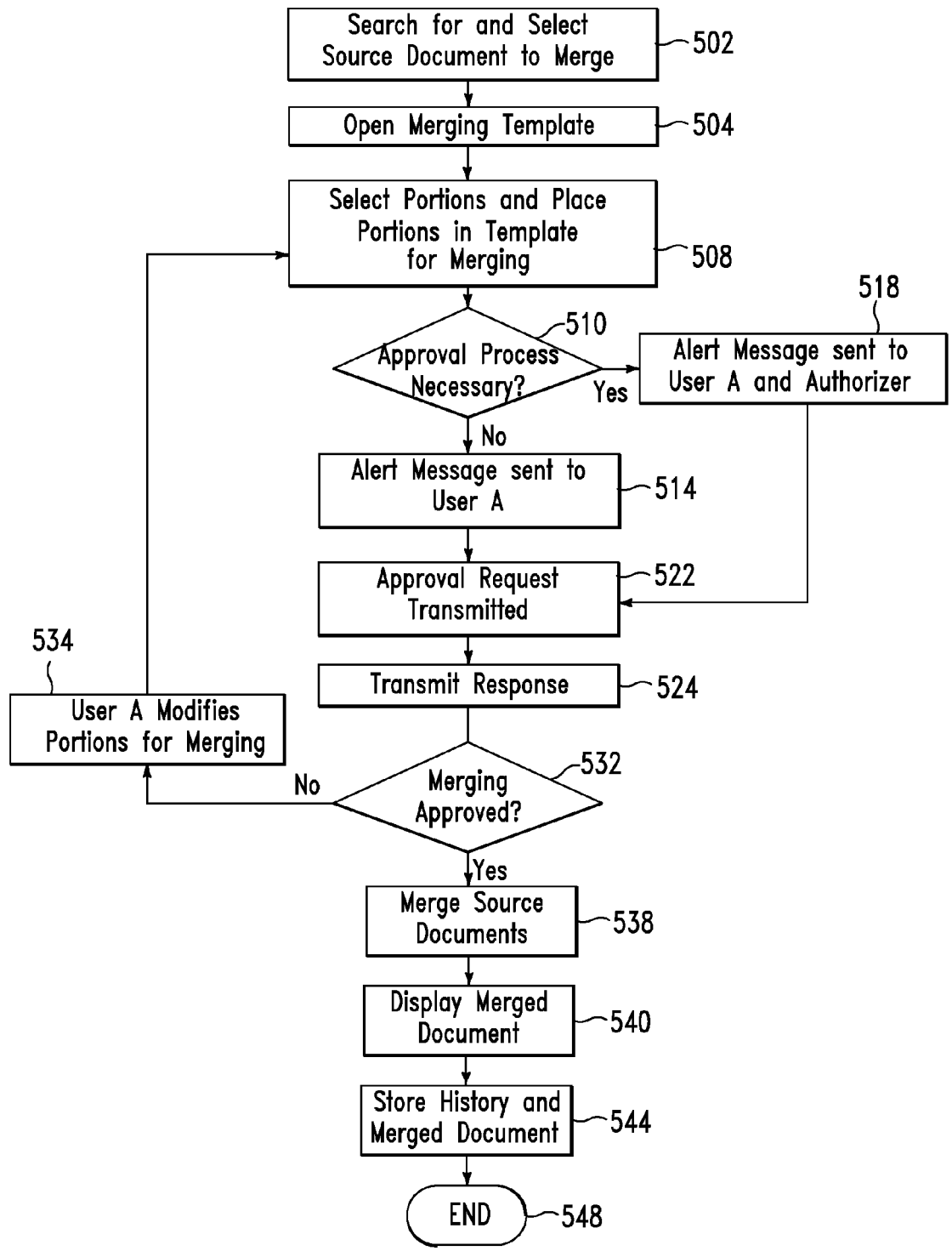
FIG. 5 illustrates a flowchart describing an overall algorithm used by the system of FIG. 1 for authorizing a merging of source documents, in accordance with embodiments of the present invention.

FIG. 5 illustrates a flowchart describing an overall algorithm used by system 2 of FIG. 1 for authorizing a merging of source documents, in accordance with embodiments of the present invention. In step 502, a merging template is selected and opened. In step 508, user A uses a drag-n-drop method to select portions of the source documents and place the selected portions into the template for merging. In step 510, computing system 10 determines if a dynamic approval process is necessary.

If in step 510, computing system 10 determines that a dynamic approval process is not necessary then in step 514, an alert message specifying that a dynamic approval process is not necessary is transmitted (i.e., via email, IM, cell phone, etc.) to user A.

If in step 510, computing system 10 determines that a dynamic approval process is necessary then in step 518, an alert message specifying that a dynamic approval process is necessary and is transmitted (i.e., via email, IM, cell phone, etc.) to an authorizer and user A. The alert message generated in step 518 additionally highlights the portions of the source documents selected in step 508. In step 522, an approval request is transmitted to the authorizer and/or user A. In step 524, the authorizer and/or user transmits a response (i.e., approving or disapproving the merging of the source documents) back to computing system 10. In step 532, computing system 10 determines if the authorizer and/or user A has approved the merging of the source documents.

If in step 532, computing system 10 determines that the authorizer and/or user A has not approved the merging of the source documents then in step 534, user A modifies the portions for merging (e.g., selects new portions of the source documents for merging) and step 508 is repeated.

If in step 532, computing system 10 determines that the authorizer and/or user A has approved the merging of the source documents then in step 538, the source documents are merged. In step 540, the merged document is displayed for user A and/or the authorizer. In step 544, the merged document and the merging history are stored in computing system 10 and the process terminates in step 548.

Figure 6:
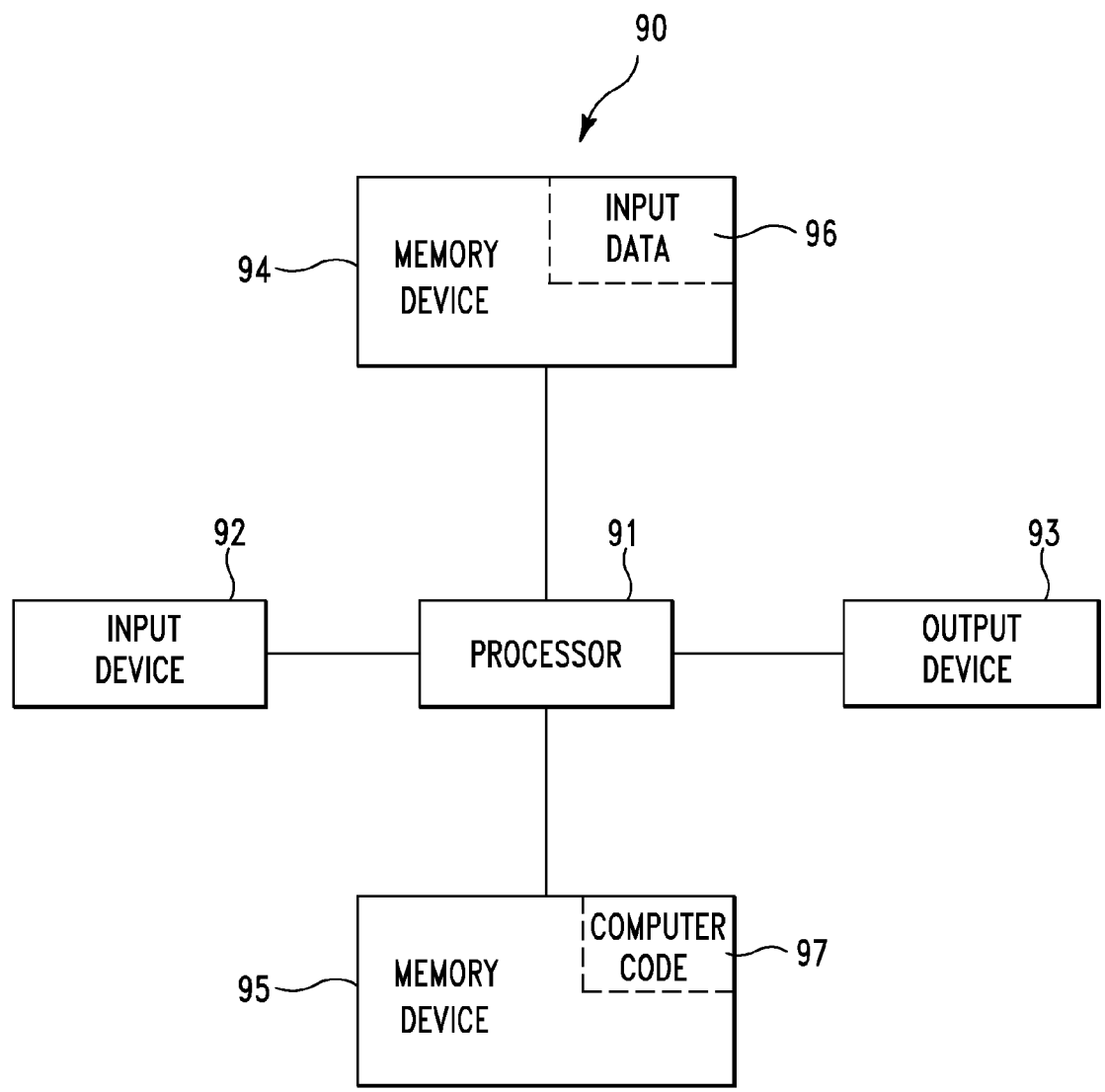
FIG. 6 illustrates a computer apparatus used for merging source documents according to various parameters, in accordance with embodiments of the present invention.

FIG. 6 illustrates a computer apparatus 90 (e.g., computing system 10 of FIG. 1) used for merging source documents according to various parameters, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for merging source documents according to various parameters. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2-5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to merge source documents according to various parameters. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for merging source documents according to various parameters. In another embodiment, the invention provides a business method that performs the process steps of the invention on a subscription, advertising, and/or fee basis. That is, a service provider, such as a Solution Integrator, could offer to merge source documents according to various parameters. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A document merging method comprising:
receiving, by a computing system, a plurality of documents, wherein said computing system comprises a memory system;
receiving, by said computing system from a first user, a first command for tagging portions of each document of said plurality of documents according to various parameters, wherein said various parameters comprise parameters associated with a topic or category of information of said plurality of documents and a predefined priority or rating of the information, and wherein said portions comprise sentences or paragraphs within said plurality of documents;
ranking, by said computing system, said various parameters;
verifying and highlighting, by said computing system, said portions of each document;
determining, by said computing system, if said plurality of documents comprise fragment and security errors;
retrieving, by said computing system from said memory system, identification tags associated with said various parameters;
assigning, by said computing system in response to said first command and in accordance with said ranking, said identification tags to said portions of each said document, wherein each portion of said portions is assigned an associated identification tag of said identification tags;
storing, by said computing system within said memory system, said documents comprising said identification tags;
receiving, by said computing system from a second user, a second command for generating a merged document;
presenting, by said computing system to said second user, said identification tags;
receiving, by said computing system from said second user, a first selection of a first tag of said identification tags, said first tag associated with a first portion of a first document of said plurality of documents;
receiving, by said computing system from said second user, a second selection of a second tag of said identification tags, said second tag associated with a second portion of a second document of said plurality of documents;
generating, by said computing system in response to said first selection and said second selection, said merged document in accordance with a merging template, said merged document consisting of said first portion of said first document and said second portion of said second document; and
storing, by said computing system, said merged document in said memory system.

2. The method of claim 1, further comprising:
receiving, by said computing system from a third user, a third command for modifying said merged document;
presenting, by said computing system to said third user, said identification tags;
receiving, by said computing system from said third user, a third selection of a third tag of said identification tags, said third tag associated with a third portion of a third document of said plurality of documents;
generating, by said computing system in response to said third selection, said a modified document, said modified document comprising said first portion, said second portion, and said third portion; and
storing, by said computing system, said modified document in said memory system.

3. The method of claim 1, further comprising:
requesting, by said computing system from an authorizing user, approval for generating said merged document; and
receiving, by said computing system from said authorizing user, said approval for generating said merged document.

4. The method of claim 3, wherein said requesting said approval for generating said merged document is performed using a first instant message, and wherein said receiving said approval for generating said merged document is performed using a second instant message.

5. The method of claim 1, wherein said various parameters are selected from the group consisting of a job role, a priority level, a topic, and a category.

6. The method of claim 1, further comprising:
presenting, by said computing system to said first user in response to said second command, a plurality of merged document creation templates;
receiving, by said computing system from said second user, a selection of a first merged document creation template of said merged document creation templates; and
placing, by said computing system, said first portion of said first document and said second portion of said second document into said first merged document creation template.

7. The method of claim 1, wherein said generating said merged document is based on a fragment level.

8. A computing system comprising a processor coupled to a computer-readable memory unit, said memory unit comprising instructions that when executed by the processor implement a document merging method, said method comprising:
receiving, by said computing system, a plurality of documents;
receiving, by said computing system from a first user, a first command for tagging portions of each document of said plurality of documents according to various parameters, wherein said various parameters comprise parameters associated with a topic or category of information of said plurality of documents and a predefined priority or rating of the information, and wherein said portions comprise sentences or paragraphs within said plurality of documents;
ranking, by said computing system, said various parameters;
verifying and highlighting, by said computing system, said portions of each document;
determining, by said computing system, if said plurality of documents comprise fragment and security errors;

retrieving, by said computing system from said computer-readable memory unit, identification tags associated with said various parameters;

assigning, by said computing system in response to said first command and in accordance with said ranking, said identification tags to said portions of each said document, wherein each portion of said portions is assigned an associated identification tag of said identification tags;

storing, by said computing system within said computer-readable memory unit, said documents comprising said identification tags;

receiving, by said computing system from a second user, a second command for generating a merged document;

presenting, by said computing system to said second user, said identification tags;

receiving, by said computing system from said second user, a first selection of a first tag of said identification tags, said first tag associated with a first portion of a first document of said plurality of documents;

receiving, by said computing system from said second user, a second selection of a second tag of said identification tags, said second tag associated with a second portion of a second document of said plurality of documents;

generating, by said computing system in response to said first selection and said second selection, said merged document in accordance with a merging template, said merged document consisting of said first portion of said first document and said second portion of said second document; and storing, by said computing system, said merged document in said computer-readable memory unit.

9. The computing system of claim 8, wherein said method further comprises:

receiving, by said computing system from a third user, a third command for modifying said merged document;

presenting, by said computing system to said third user, said identification tags;

receiving, by said computing system from said third user, a third selection of a third tag of said identification tags, said third tag associated with a third portion of a third document of said plurality of documents;

generating, by said computing system in response to said third selection, said a modified document, said modified document comprising said first portion, said second portion, and said third portion; and storing, by said computing system, said modified document in said computer-readable memory unit.

10. The computing system of claim 8, wherein said method further comprises:

requesting, by said computing system from an authorizing user, approval for generating said merged document; and receiving, by said computing system from said authorizing user, said approval for generating said merged document.

11. The computing system of claim 10, wherein said requesting said approval for generating said merged document is performed using a first instant message, and wherein said receiving said approval for generating said merged document is performed using a second instant message.

12. The computing system of claim 8, wherein said various parameters are selected from the group consisting of a job role, a priority level, a topic, and a category.

13. The computing system of claim 8, wherein said method further comprises:

presenting, by said computing system to said first user in response to said second command, a plurality of merged document creation templates;

receiving, by said computing system from said second user, a selection of a first merged document creation template of said merged document creation templates; and placing, by said computing system, said first portion of said first document and said second portion of said second document into said first merged document creation template.

14. The computing system of claim 8, wherein said generating said merged document is based on a fragment level.

15. A process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing a document merging method, said method comprising:

receiving, by said computing system, a plurality of documents;

receiving, by said computing system from a first user, a first command for tagging portions of each document of said plurality of documents according to various parameters, wherein said various parameters comprise parameters associated with a topic or category of information of said plurality of documents and a predefined priority or rating of the information, and wherein said portions comprise sentences or paragraphs within said plurality of documents;

ranking, by said computing system, said various parameters;

verifying and highlighting, by said computing system, said portions of each document;

determining, by said computing system, if said plurality of documents comprise fragment and security errors;

retrieving, by said computing system from said computer-readable memory unit, identification tags associated with said various parameters;

assigning, by said computing system in response to said first command and in accordance with said ranking, said identification tags to said portions of each said document, wherein each portion of said portions is assigned an associated identification tag of said identification tags;

storing, by said computing system within said computer-readable memory unit, said documents comprising said identification tags;

receiving, by said computing system from a second user, a second command for generating a merged document;

presenting, by said computing system to said second user, said identification tags;

receiving, by said computing system from said second user, a first selection of a first tag of said identification tags, said first tag associated with a first portion of a first document of said plurality of documents;

receiving, by said computing system from said second user, a second selection of a second tag of said identification tags, said second tag associated with a second portion of a second document of said plurality of documents;

generating, by said computing system in response to said first selection and said second selection, said merged document in accordance with a merging template, said merged document consisting of said first portion of said first document and said second portion of said second document; and storing, by said computing system, said merged document in said computer-readable memory unit.

16. The process of claim 15, wherein said method further comprises:

receiving, by said computing system from a third user, a third command for modifying said merged document;

presenting, by said computing system to said third user, said identification tags;

receiving, by said computing system from said third user, a third selection of a third tag of said identification tags, said third tag associated with a third portion of a third document of said plurality of documents;

generating, by said computing system in response to said third selection, said a modified document, said modified document comprising said first portion, said second portion, and said third portion; and storing, by said computing system, said modified document in said computer-readable memory unit.

17. The process of claim 15, wherein said method further comprises:

requesting, by said computing system from an authorizing user, approval for generating said merged document; and receiving, by said computing system from said authorizing user, said approval for generating said merged document.

18. The process of claim 17, wherein said requesting said approval for generating said merged document is performed using a first instant message, and wherein said receiving said approval for generating said merged document is performed using a second instant message.

19. The process of claim 15, wherein said various parameters are selected from the group consisting of a job role, a priority level, a topic, and a category.

20. The process of claim 15, wherein said method further comprises:

presenting, by said computing system to said first user in response to said second command, a plurality of merged document creation templates;

receiving, by said computing system from said second user, a selection of a first merged document creation template of said merged document creation templates; and placing, by said computing system, said first portion of said first document and said second portion of said second document into said first merged document creation template.

21. The process of claim 15, wherein said generating said merged document is based on a fragment level.

22. A computer program product, comprising a tangible computer readable storage device storing a computer readable program code embodied therein, said computer readable program code adapted to implement a document merging method within a computing system, said method comprising:

receiving, by said computing system, a plurality of documents;

receiving, by said computing system from a first user, a first command for tagging portions of each document of said plurality of documents according to various parameters, wherein said various parameters comprise parameters associated with a topic or category of information of said plurality of documents and a predefined priority or rating of the information, and wherein said portions comprise sentences or paragraphs within said plurality of documents;

ranking, by said computing system, said various parameters;

verifying and highlighting, by said computing system, said portions of each document;

determining, by said computing system, if said plurality of documents comprise fragment and security errors;

retrieving, by said computing system from said tangible computer readable storage device, identification tags associated with said various parameters;

assigning, by said computing system in response to said first command and in accordance with said ranking, said identification tags to said portions of each said document, wherein each portion of said portions is assigned an associated identification tag of said identification tags;

storing, by said computing system, said documents comprising said identification tags;

receiving, by said computing system from a second user, a second command for generating a merged document;

presenting, by said computing system to said second user, said identification tags;

receiving, by said computing system from said second user, a first selection of a first tag of said identification tags, said first tag associated with a first portion of a first document of said plurality of documents;

receiving, by said computing system from said second user, a second selection of a second tag of said identification tags, said second tag associated with a second portion of a second document of said plurality of documents;

generating, by said computing system in response to said first selection and said second selection, said merged document in accordance with a merging template, said merged document consisting of said first portion of said first document and said second portion of said second document; and storing, by said computing system, said merged document.

23. The computer program product of claim 22, wherein said method further comprises:

receiving, by said computing system from a third user, a third command for modifying said merged document;

presenting, by said computing system to said third user, said identification tags;

receiving, by said computing system from said third user, a third selection of a third tag of said identification tags, said third tag associated with a third portion of a third document of said plurality of documents;

generating, by said computing system in response to said third selection, said a modified document, said modified document comprising said first portion, said second portion, and said third portion; and storing, by said computing system, said modified document.

24. The computer program product of claim 22, wherein said method further comprises:

requesting, by said computing system from an authorizing user, approval for generating said merged document; and receiving, by said computing system from said authorizing user, said approval for generating said merged document.

25. The computer program product of claim 24, wherein said requesting said approval for generating said merged document is performed using a first instant message, and wherein said receiving said approval for generating said merged document is performed using a second instant message.

* * * * *